UNITED STATES PATENT OFFICE.

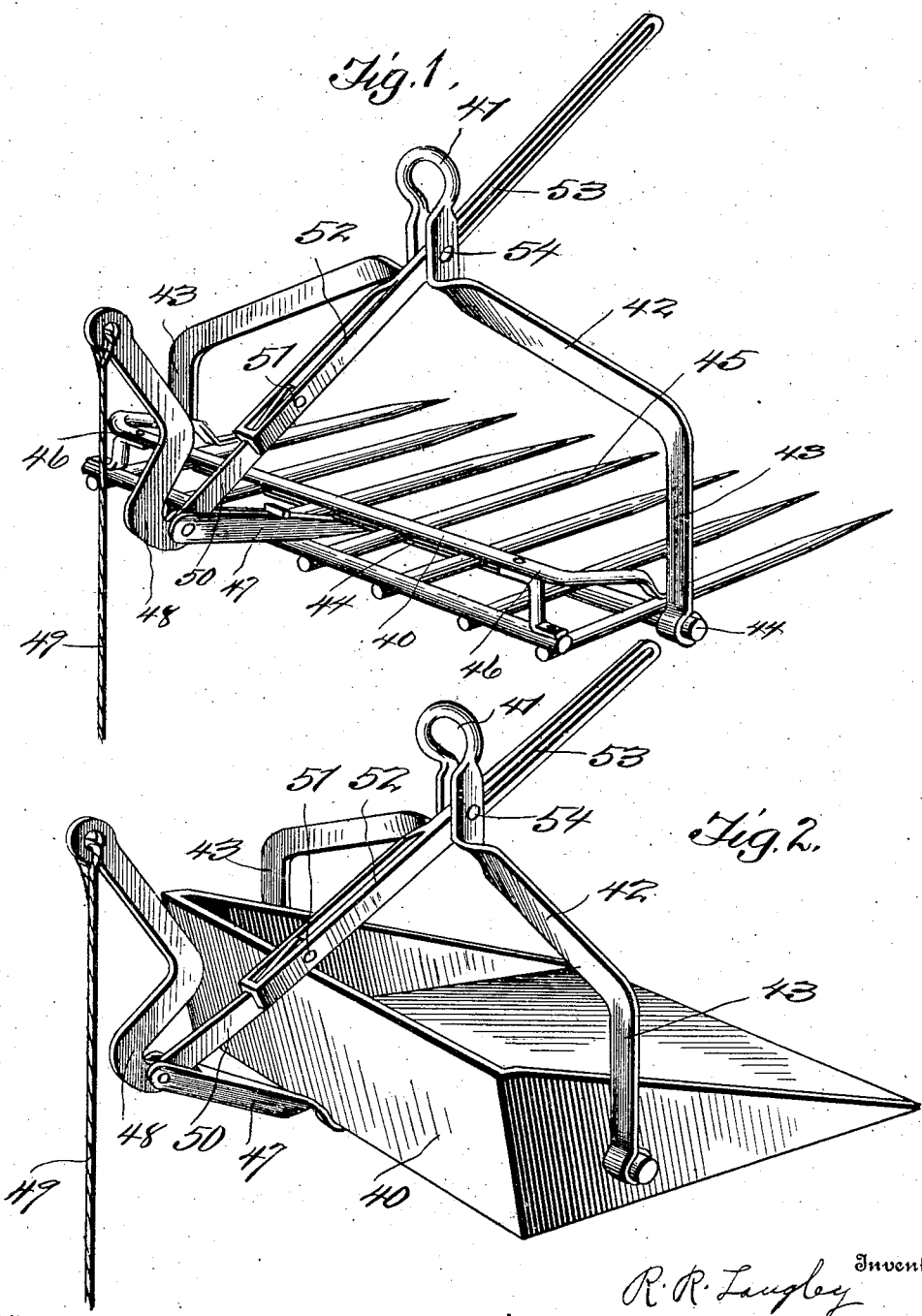

RALPH R. LANGLEY, OF LINCOLN, NEBRASKA.

LOADER.

No. 845,556.　　　　Specification of Letters Patent.　　　　Patented Feb. 26, 1907.

Application filed January 17, 1906. Serial No. 296,522.

*To all whom it may concern:*

Be it known that I, RALPH R. LANGLEY, a citizen of the United States, residing at Lincoln, in the county of Lancaster and State of Nebraska, have invented a new and useful Loader; and I do hereby declare the following to be a full, clear, and exact description of the invention, such as will enable others skilled in the art to which it appertains to make and use the same.

The invention relates to new and useful improvements in manure-loaders, and has for its object to provide a loader having novel means for tripping the same, and which is adapted to be readily raised and lowered as desired, and which can carry either a scoop or fork.

In the drawing, Figure 1 is a perspective view of my invention as shown employing a fork. Fig. 2 is a similar view to Fig. 1, showing the scoop.

Referring to the drawings, 40 designates the loader proper, which may be of a variety of styles or forms, having a U-shaped or arched-form lever 42 and having a suitable eye 41 for connecting with a suitable source of power for raising and lowering the device, as will be readily understood. The U-shaped lever 42 has downwardly-extending arms 43, which are pivoted to a bar 44, which in turn forms a part of the frame of the fork and also braces the teeth 45, as shown in the drawings. In the construction of the scoop the lateral downwardly-extending arms 43 are connected to the sides of the said scoop, as also shown in the drawings. The fork is braced by means of framing 46, as clearly illustrated in the accompanying drawings.

Projecting from the rear of the fork or scoop is an arm 47, which has pivoted therein a bell-crank lever 48, one arm of which is provided with a cable 49 for operating the said bell-crank lever, which in turn operates the fork or scoop for dumping the same, and the other arm 50 of the bell-crank lever forms a toggle connection, as at 51, with a slotted lever 52, the slotted portion 53 of which is pivoted upon a pin 54, adjacent to the eye 41, as shown clearly in the drawings.

Having thus fully described the invention, what is claimed as new and useful with the protection of Letters Patent, is—

1. A loader, having a rearwardly-projecting arm, a bell-crank lever mounted in the end of said arm, an approximately U-shaped handle pivotally connected with said loader, a link having a slotted end pivotally mounted in said handle, the other end being connected with said bell-crank lever, for tripping said loader.

2. A loader having a handle pivoted thereto, an arm having a slotted end, and connected with said loader, a bell-crank lever mounted in said slotted end, a link slidably mounted in said handle, and connected with said bell-crank lever, whereby the loader may be tripped.

3. A loader having a U-shaped handle, pivoted thereto, said handle also forming a loop, a rearwardly-projecting arm mounted on said loader, a bell-crank lever mounted in said arm, a link having a slot in the lower end thereof, for the reception of one end of the bell-crank lever, said link also having a slot in the upper end thereof forming a slidable connection with said handle, and a cable connected with said bell-crank lever for tripping said loader.

In testimony whereof I have hereto affixed my signature in the presence of two witnesses.

RALPH R. LANGLEY.

Witnesses:
　S. C. HAWTHORNE,
　W. F. GRAHAM.